(12) United States Patent
Djordjevic et al.

(10) Patent No.: US 10,172,024 B2
(45) Date of Patent: Jan. 1, 2019

(54) TECHNIQUE FOR OPERATING A MOVABLE RADIO BASE STATION

(71) Applicant: Telefonaktiebolaget LM Ericsson (publ), Stockholm (SE)

(72) Inventors: Branko Djordjevic, Herzogenrath (DE); Nadia Brahmi, Hildesheim (DE); Torsten Dudda, Aachen (DE); Hanzhi Zhang, München (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 15/326,716

(22) PCT Filed: Jul. 25, 2014

(86) PCT No.: PCT/EP2014/066069
§ 371 (c)(1),
(2) Date: Jan. 17, 2017

(87) PCT Pub. No.: WO2016/012055
PCT Pub. Date: Jan. 28, 2016

(65) Prior Publication Data
US 2017/0208489 A1    Jul. 20, 2017

(51) Int. Cl.
*H04W 24/08* (2009.01)
*H04W 84/00* (2009.01)
*B64C 39/02* (2006.01)
*H04W 24/10* (2009.01)
*H04W 36/20* (2009.01)
(Continued)

(52) U.S. Cl.
CPC .......... *H04W 24/08* (2013.01); *B64C 39/024* (2013.01); *H04B 7/18504* (2013.01); *H04W 24/10* (2013.01); *H04W 36/20* (2013.01); *H04W 84/005* (2013.01); *B64C 2201/122* (2013.01); *H04W 84/06* (2013.01); *H04W 88/08* (2013.01)

(58) Field of Classification Search
CPC ..... H04W 24/08; H04W 24/10; H04W 36/20; H04W 84/005; H04W 88/08; B64C 39/024; B64C 2201/122
See application file for complete search history.

(56) References Cited

U.S. PATENT DOCUMENTS 8,934,850 B1 * 1/2015 Wu .................... H04B 1/40 455/101
9,913,173 B2 * 3/2018 Koodli .............. H04W 36/0016
(Continued)

FOREIGN PATENT DOCUMENTS

EP    1274268 A2    1/2003

OTHER PUBLICATIONS

Oceus Networks Inc. "DACA Test Experiment Report"; Retrieved from the internet: URL:http://apps.fcc.gov/ecfs/document/view?id= 7521070850 [retrieved on Sep. 18, 2014]; Jan. 30, 2014, pp. 1-25.

*Primary Examiner* — Kevin D Mew
(74) *Attorney, Agent, or Firm* — Sage Patent Group

(57) ABSTRACT

A movable radio base station, M-RBS, configured to provide to a plurality of user equipments wireless access to a telecommunications network is changed from a first mode to a second mode that is different from the first mode. Each of the first mode and the second mode specifies a set of parameter values for operating parameters of the M-RBS.

15 Claims, 4 Drawing Sheets

(51) Int. Cl.
 *H04B 7/185* (2006.01)
 *H04W 84/06* (2009.01)
 *H04W 88/08* (2009.01)

(56) References Cited

U.S. PATENT DOCUMENTS

| | | | |
|---|---|---|---|
| 9,924,489 B2* | 3/2018 | Garg | H04W 64/006 |
| 2003/0216142 A1* | 11/2003 | Wigren | H04W 64/00 |
| | | | 455/456.1 |
| 2004/0097227 A1* | 5/2004 | Siegel | H04B 7/2606 |
| | | | 455/431 |
| 2009/0023458 A1* | 1/2009 | Mountney | H04W 16/14 |
| | | | 455/456.1 |
| 2011/0092237 A1* | 4/2011 | Kato | H04W 64/003 |
| | | | 455/507 |
| 2012/0057538 A1* | 3/2012 | Adhikari | H04L 1/0025 |
| | | | 370/329 |
| 2012/0139783 A1* | 6/2012 | Hallam | G01S 19/24 |
| | | | 342/357.25 |
| 2013/0324070 A1 | 12/2013 | Bennett et al. | |
| 2014/0092803 A1 | 4/2014 | Picker | |
| 2015/0185331 A1* | 7/2015 | Dai | G01S 19/44 |
| | | | 342/357.27 |
| 2015/0260824 A1* | 9/2015 | Malveaux | G08G 5/0008 |
| | | | 340/870.09 |
| 2016/0088585 A1* | 3/2016 | Garg | H04W 64/006 |
| | | | 455/456.5 |
| 2017/0303168 A1* | 10/2017 | Koodli | H04W 36/0016 |

* cited by examiner

300 — Operation of a movable radio base station (M-RBS) that provides to a plurality of user equipments (UEs) wireless access to a telecommunications network 310 — Change the M-RBS from a first mode to a second mode different from the first mode, wherein each of the first mode and the second mode specifies a set of parameter values for operating parameters of the M-RBS

300

TECHNIQUE FOR OPERATING A MOVABLE RADIO BASE STATION

TECHNICAL FIELD

The present disclosure relates to a technique for operating a radio base station of a telecommunications network. More specifically, and without limitation, a method and a device for operating a movable radio base station are provided.

BACKGROUND

Telecommunications networks provide voice and data services at increasing data rates. The density of user equipments (UEs), to which such services are provided, is also steadily increasing and requires a properly configured network infrastructure. However, there are areas where, and occasions when, access to the telecommunications network, e.g., in terms of data connectivity or data rate, is insufficient or unavailable.

A Test Experiment Report dated 30 Jan. 2014 and submitted to the U.S. Federal Communications Commission (FCC) by Oceus Networks Inc. and Space Data Corporation describes a Deployable Aerial Communications Architecture (DACA) using an Ericsson Digital Unit for LTE (DUL) and an Ericsson Radio Unit (RUS 01) carried by an unmanned free balloon.

Using conventional techniques, it is difficult, if not impossible, to properly configure a network infrastructure including such non-stationary radio base stations in order to achieve flexible access to the telecommunications network.

SUMMARY

Accordingly, there is a need for a technique that provides flexible access to a telecommunications network.

According to one aspect, a method of operating a movable radio base station (M-RBS) is provided. The M-RBS provides wireless access to a telecommunications network for a plurality of user equipments (UEs). The method comprises the step of changing the M-RBS from a first mode to a second mode. The second mode is different from the first mode.

Each of the first mode and the second mode may be associated with a set of parameter values specifying the operation of the M-RBS. Each of the first mode and the second mode may specify a set of parameter values for operating parameters of the M-RBS. E.g., the parameter values may be set to predefined values when entering the corresponding mode, e.g., in response to changing to the second mode. The parameter values may be predefined for each mode. E.g., at least one parameter value associated with the first mode may be different from a respective parameter value associated with the second mode.

In the context of the application, the term "movable radio base station" may particularly denote a base station providing radio access and being actively and/or passively movable in one or more spatial directions.

The M-RBS may be part of a radio access network (RAN) of the telecommunications network. Changing the mode of operating the M-RBS may allow planning radio network coverage, e.g., according to an observed, measured, expected and/or predicted need.

The operating parameters may include radio parameters. Changing the mode may allow setting or optimizing the radio parameters of the M-RBS. The parameter values may be set according to the mode.

One or more of the parameter values may be changed while in the current mode, e.g., while the M-RBS is in the second mode. The parameter values may be adjusted or fine-tuned based on a result of a measurement performed or received by the M-RBS.

The telecommunications network may be a cellular telecommunications network. The M-RBS may provide the wireless access to one cell of the telecommunications network. E.g., the M-RBS may (e.g., temporarily) function as one cell of the telecommunications network. The telecommunications network may be implemented according to Long Term Evolution (LTE). In at least some implementations of the technique, changing the mode of operating the M-RBS may allow planning relations between the cells of the telecommunications network, e.g., for robust or reliable mobility of the UEs between the cells. Same or other implementations of the technique may allow keeping up the coverage for all supported UEs and/or providing sufficient network capacity.

The method may further comprise the step of exchanging with another M-RBS (e.g., by receiving from and/or signaling to one or more neighboring M-RBSs) at least one of the mode of the M-RBS, the parameter values of the M-RBS and results of measurements performed by the M-RBS. The method may comprise at least one of the step of performing, at the M-RBS, a measurement resulting in a measurement result; and the step of receiving, at the M-RBS, a measurement result of a measurement, e.g., from another M-RBS performing the measurement. The parameter values and/or the measurement results may be collected at the M-RBS.

The measurement may relate to the wireless access. The measurement result may be indicative of radio interference between the M-RBS and one or more neighboring M-RBSs. Alternatively or in addition, the measurement result may be indicative of handovers of one or more of the UEs. E.g., the measurement may be indicative of a number of handovers. The handovers may involve the M-RBS as a source cell of the handover. Alternatively or in addition, the measurement result may be indicative of a velocity of one or more UEs connected to the M-RBS and/or an inhomogeneity of the connected UEs.

Changing the mode and/or changing the one or more of the parameter values may be triggered by a command received from a network operation center (NOC) and/or the measurement result.

Alternatively or in addition, the mode may be changed as a function of time and/or location of the M-RBS. For example, the cells of the telecommunications network may, at least substantially, be fixed relative to ground. The M-RBS may assume a cell identity according to a cell area currently covered by the M-RBS.

The M-RBS may be mounted on an unmanned vehicle. The vehicle may be an aerial vehicle, ground vehicle and/or surface vehicle. More specifically, the vehicle may be a drone, a wheel-based robot, a balloon, a zeppelin, a blimp, a multi-rotor helicopter or an electric aircraft.

Network performance may be optimized using the M-RBS mounted on the vehicle. A configuration of the RAN formed by a plurality of M-RBSs may be derived from the mode assigned to each of the plurality of M-RBSs. The mode may also be referred to as a mission. Depending on the mode, the M-RBS may provide temporally increased coverage or a higher network capacity in the covered area, e.g., by means of spatial multiplexing.

The operating parameters may relate to radio transmission and/or radio reception of the M-RBS. The operating parameters may include at least one of a maximum number of wirelessly connected UEs, a carrier frequency, a frequency bandwidth, a transmission power, one or more tilt angles of one or more antennas configured to provide the wireless access and a threshold for allowing UE handover. The one or more antennas may be mounted at the M-RBS. The parameters may be dynamically set based on the result of the measurement and/or context information, e.g., received from the NOC. The context information may include, or may relate to, mobility of UEs, density of UEs, predefined services and/or predefined network coverage.

The operating parameters may relate to position and/or motion of the M-RBS. The operating parameters may include location, altitude and velocity of the M-RBS, e.g., relative to one or more of the UEs. The carrier frequency and/or frequency bandwidth may depend on the location of the M-RBS and/or the velocity of the M-RBS. The altitude and/or velocity may be measured relative to ground or relative to one or more of the UEs.

The altitude may be proportional to the square root of the maximum number of the UEs connected to the M-RBS. Alternatively or in addition, the altitude may be proportional to the inverse square root of an area density of the connected UEs.

The transmission power may be proportional to the inverse square of the altitude. The transmission power and/or the altitude may depend on energy resources available at the M-RBS and/or a level of power supplied to the M-RBS. Alternatively or in addition, changing the mode may include decreasing the altitude of the M-RBS and triggering one or more neighboring M-RBSs to increase their altitude.

The modes may include approaching or maintaining a geostationary position of the M-RBS, reducing a velocity relative to one or more of the UEs, covering a gap in the wireless access of the telecommunications network, providing the wireless access in in an area not, or not sufficiently, covered by other cells of the telecommunications network, locally increasing network capacity (e.g., in terms of a number of connectable UEs and/or data throughput achievable per UE) and/or reducing the velocity of the M-RBS relative to one or more of the UEs. The gap covered by the M-RBS may include UEs or an area not covered by neighboring M-RBSs and/or stationary radio base stations (S-RBSs).

For reducing the velocity relative to the one or more UEs or for following the one or more UEs, the M-RBS may determine movement of the one or more UEs. The movement may be measured by means of the Doppler effect. Alternatively or in addition, the M-RBS may follow the one or more UEs by maintaining a received signal strength, e.g., a Reference Signal Received Power (RSRP), within predefined limits.

The M-RBS may be in wireless communication with a backhaul network and/or a core network of the telecommunications network. The modes may further include a backhaul functionality, e.g., in parallel to one of the other modes. The method may further include the step of wirelessly connecting neighboring M-RBSs with a backhaul network and/or a core network of the telecommunications network.

The first mode and the second mode may be different as to a performance of the M-RBS. The performance may include a data rate of the wireless access and/or a coverage area parameter of the wireless access. Alternatively or in addition, the performance may relate to one UE or a subset of the UEs out of the plurality of UEs and/or to UEs in an area covered by the wireless access.

The M-RBS may be solar-powered. Alternatively or in addition, the power for the M-RBS may be provided by a rechargeable battery. The mode may be changed for returning to a recharging base, e.g., depending on a status of the rechargeable battery and/or the power provided by solar cells. Changing the mode may take current or predicted weather conditions into account.

According to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., the telecommunications network and/or the Internet.

According to a hardware aspect, a device for operating a movable radio base station (M-RBS) is provided. The M-RBS provides wireless access to a telecommunications network for a plurality of user equipments (UEs). The device comprises a changing unit adapted to change the M-RBS from a first mode to a second mode. The second mode is different from the first mode. Each of the first mode and the second mode specifies a set of parameter values for operating parameters of the M-RBS.

The device, the changing unit or a dedicated unit may further be adapted to perform any one of the steps of the method aspect and/or may include any feature disclosed in the context of the method aspect.

According to a further aspect, a movable radio base station (M-RBS) is provided. The M-RBS is configured to provide to a plurality of user equipments (UEs) wireless access to a telecommunications network. The M-RBS comprises and/or is in communication with the device for operating the M-RBS.

The M-RBS may further comprise one or more sensors adapted to detect one or more mammals, e.g., a human being. Each of the mammals may be associated with one or more of the plurality of UEs. The one or more sensor may be further adapted for infrared imaging. The mammals may be associated with the UEs by correlating a direction of the wireless access and the infrared imaging.

The M-RBS, e.g. the changing unit, may be further adapted to compare a first number of UEs connected to the M-RBS and a second number of mammals detected by the one or more sensors. An action may be triggered depending on a result of the comparison. A difference between the first number and the second number may indicate a number of survivors, e.g., after an accident. E.g., detecting a person by means of the infrared imaging may indicate that the person is alive and unprotected (e.g., against weather or cold at night). The number of survivors, and preferably a location estimate for each survivor, may be forwarded to the NOC and/or an emergency service.

BRIEF DESCRIPTION OF THE DRAWINGS

In the following, the present disclosure is described in more detail with reference to exemplary embodiments illustrated in the drawings, wherein.

DETAILED DESCRIPTION

In the following description, for purposes of explanation and not limitation, specific details are set forth, such as specific device environments and specific propulsion scenarios in order to provide a thorough understanding of the technique disclosed herein. It will be apparent to one skilled in the art that the technique may be practiced in other embodiments that depart from these specific details. Moreover, while the following embodiments are primarily described for a Long Term Evolution (LTE) implementation, it will be readily apparent that the technique described herein may also be implemented in other wireless and wired communication networks, including Global System for Mobile Communications (GSM) networks, Universal Mobile Telecommunications System (UMTS) networks and LTE-Advanced networks.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
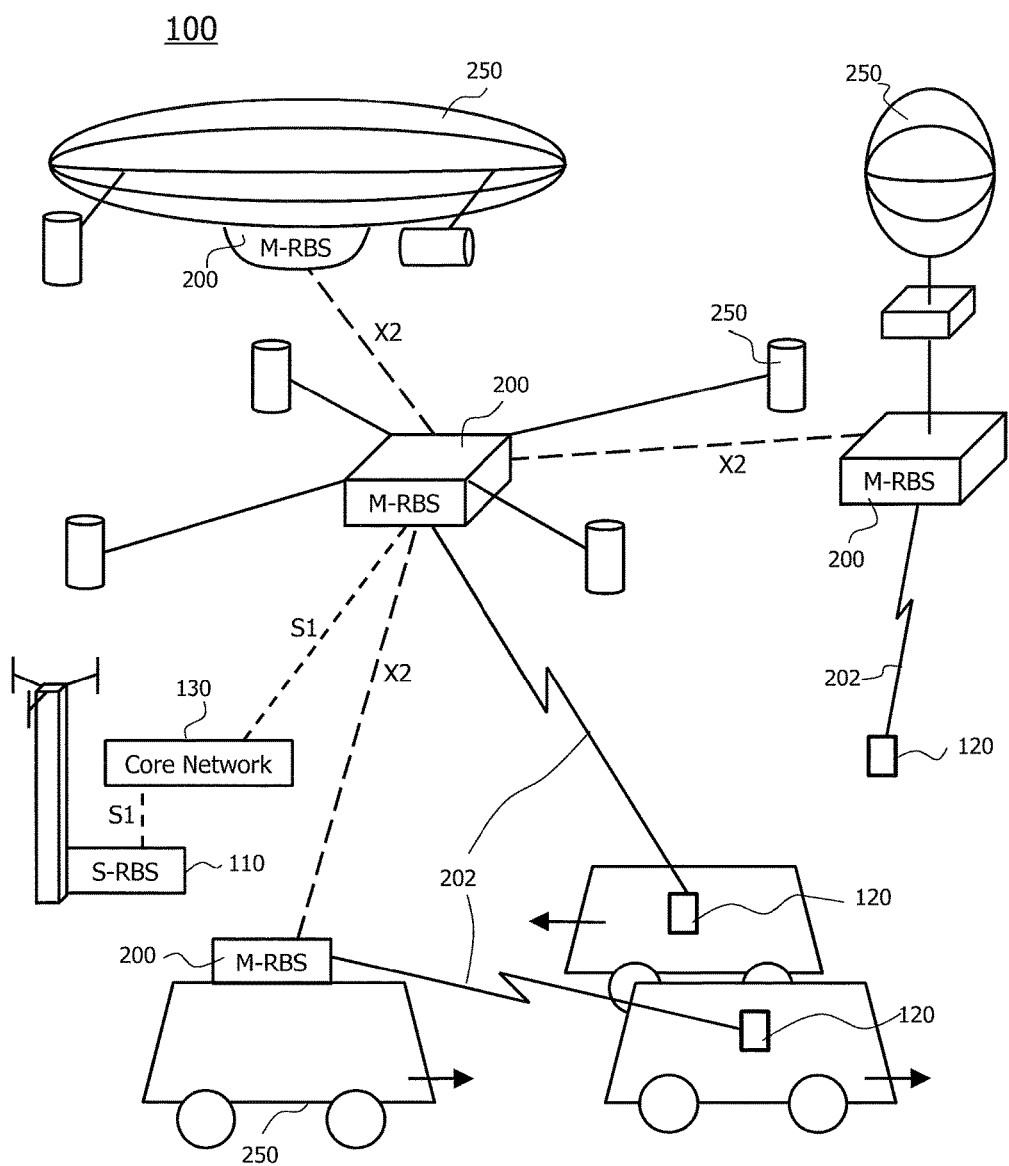
FIG. 1 schematically illustrates a telecommunications network including a plurality of movable radio base stations.

FIG. 1 schematically illustrates a telecommunications network 100 as an exemplary environment for implementing the technique. The telecommunications network 100 includes one or more movable radio base stations (M-RBS) 200 and, optionally, one or more stationary radio base stations (S-RBS) 110. Each of the M-RBS 200 is independently movable by means of a vehicle 250 to which the M-RBS 200 is mounted. Each of the S-RBS 110 and the M-RBS 200 is configured to provide to a plurality of user equipments (UEs) 120 wireless access 202 to the telecommunications network 100.

The telecommunications network 100 further includes a core network (CN) 130. In an exemplary LTE implementation, the CN 130 is an Evolved Packed Core including a System Architecture Evolution Gateway (SAE-GW). The M-RBSs 200 communicates among each other using an X2 interface. One or a subset of the M-RBSs 200 communicates with the CN 130 using an S1 interface.

By way of example, drone technology evolved, e.g. in the last decade, to become more powerful and cheaper. Mounting the M-RBS to a drone results in a radio base station with drone capabilities. The term "drone", as used herein, encompasses an airplane, a balloon, a zeppelin, blimp, a quadrocopter or any other unmanned airborne vehicle. For example, the M-RBS 200 can fly to a commanded, predetermined or autonomously determined destination for providing the wireless access 202. The M-RBS 200 can land or cruise around an area depending on a mode of operating the M-RBS 200. E.g., the M-RBS 200 can be mounted on an airplane flying at a high altitude in a stationary mode. Alternatively or in addition, an equal or another M-RBS 200 is mounted on a vehicle capable of moving on ground and/or a water surface. The M-RBS provides radio coverage and/or enables various services (or improvements of services) for the UEs 120.

Figures 2, 3:
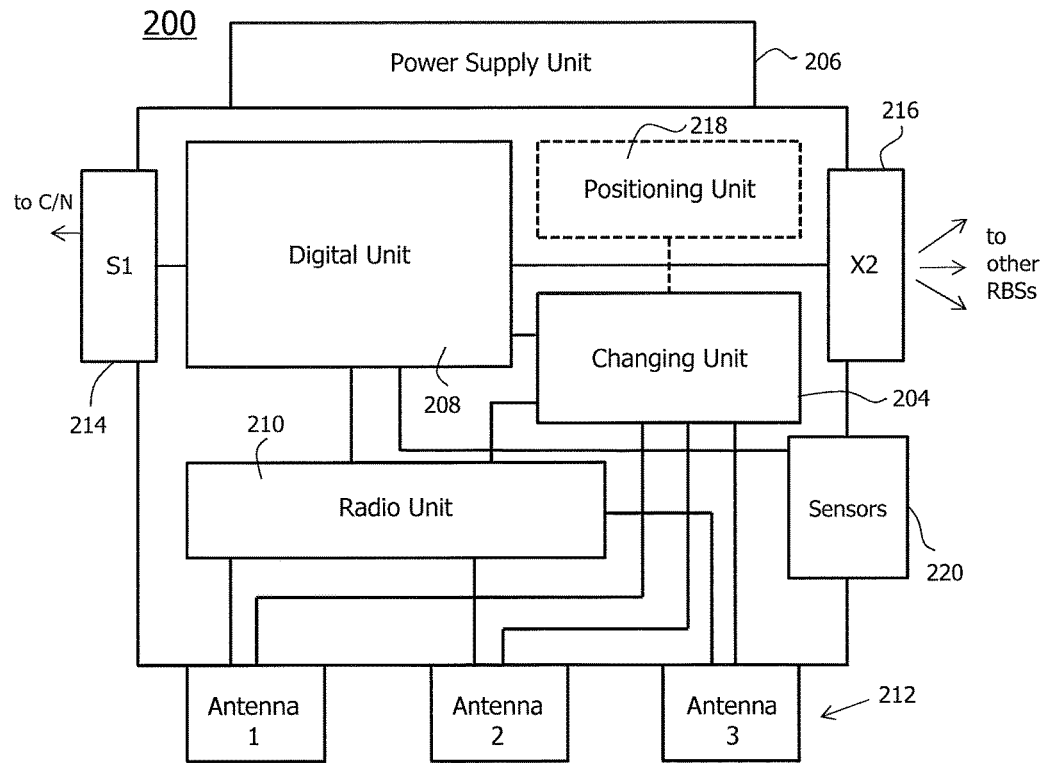
FIG. 2 shows a schematic block diagram of an embodiment of a movable radio base station including a device for operating the movable radio base station implementable in the telecommunications network of FIG. 1.
FIG. 3 shows a flowchart of a method of operating the movable radio base station of FIG. 1 or 2.

FIG. 2 is a schematic block diagram of an embodiment of the M-RBS 200 illustrated in FIG. 1. The M-RBS 200 includes units providing the functionality of a radio base station (e.g., the functionality of an evolved Node B or eNodeB) and a changing unit 204. A device for operating the M-RBS 200 may be implemented by any subset of the M-RBS 200 including at least the changing unit 204.

The embodiment of the M-RBS 200 includes a power supply 206, a digital unit 208 (which may include one or more processors), several sensors 220 (e.g., infrared sensor, motion sensor, etc.) coupled to the digital unit 208, and a radio unit 210 coupled to one or more radio frequency antennas 212 for providing to the plurality of UEs 120 the wireless access 202 to the telecommunications network 100. The radio unit 210 and the antennas 212 may implement an interface of the M-RBS 200. The M-RBS 200 may also include a memory, e.g. a volatile and/or non-volatile memory, in which program code used for operating the M-RBS 200 may be stored. The changing unit 204 is coupled to at least one of the units 208 to 212 for changing the M-RBS 200 from a first mode of operation to a second mode of operation that is different from the first mode.

The digital unit 208 is coupled to external interfaces 214 and 216 of a backhaul network of the telecommunications network 100. The interfaces 214 and 216 can be implemented wirelessly, e.g., using microwave links and/or free-space optical communication (e.g., using light in the infrared, visible or ultraviolet spectrum). The interface 214 provides a wireless connection to the CN 130 of the telecommunications network 100. The interface 216 provides a wireless Point-to-Multipoint connection to S-RBSs 110 and/or other M-RBSs 200.

The M-RBS 200 optionally includes a positioning unit 218, e.g., for receiving Global Positioning System (GPS) signals. The positioning unit 218 provides positioning information to the changing unit 204 and may be coupled to the changing unit 204.

The radio unit 210 may support multiple standards. Alternatively or in addition, the radio unit 210 supports antenna diversity and is connected to a corresponding number of antennas 212.

In an advanced embodiment of the M-RBS 200, one or all of the antennas 212 include a pivotable mounting and/or reflector for changing an antenna characteristic, e.g., angular sensitivity, as an exemplary operating parameter of the M-RBS 200. Alternatively or in addition, at least one of the antennas 212 is a screwdriver antenna adjustable to cover multiple frequency bands, as an exemplary operating parameter the M-RBS 200. For example, the screwdriver antenna includes a coil that is partly decoupled by retracting a part of the coil inside a hollow tube.

FIG. 3 shows a flowchart of a method 300 for operating a movable radio base station (M-RBS) configured to provide to a plurality of user equipments (UEs) wireless access to a telecommunications network. The method 300 comprises a step 310 of changing the M-RBS from a first mode to a second mode different from the first mode, wherein each of the first mode and the second mode specifies a set of parameter values for operating parameters of the M-RBS.

The M-RBS controlled by the method 300 may be implemented according to or as the M-RBS 200 described above, e.g., as part of the telecommunications network 100. The step 310 may be performed by the changing unit 204. In the following description of the method, reference is made to the M-RBS 200 illustrated in FIGS. 1 and 2 without loss of generality.

By changing the mode of the M-RBS 200, performance of the telecommunications network 100 can be optimized using the M-RBS 200 that is movable according to the operation parameters. The M-RBS 200 is mounted on a movable robot or drone. A configuration of the telecommunications network 100 including one or more M-RBS 200 is associated with certain modes assumed by each of the M-RBS 200. At least some of the modes may be considered as a role or a mission fulfilled by the corresponding M-RBS 200. For example, the M-RBS 200 can provide more coverage or a higher capacity, e.g., compared to the telecommunications network 100 without the M-RBS 200 or compared to the telecommunications network 100 with the M-RBS 200 applying one or more different operating parameter values.

Each mode is defined by (e.g., besides global network parameters) a set of parameter values for the operating parameters of the M-RBS 200. The operating parameters are dynamically configured based on measurement results and/or context information. The measurement results and the context information is collected at the M-RBS 200 and exchanged via the interface 216 between the M-RBS 200 and one or more of the other M-RBSs 200.

Figure 4:
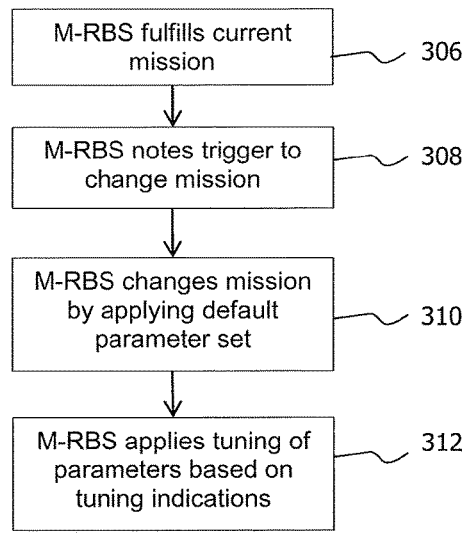
FIG. 4 shows a flowchart of an implementation of the method of FIG. 3.

FIG. 4 shows a flowchart of an implementation of the method 300. In a step 306, the M-RBS 200 is in the first mode so as to fulfil a current mission. The M-RBS 200 receives a trigger to change the first mode to a second mode in a step 308 of the method 300. In a step 310, the M-RBS 200 changes from the first mode to the second mode by applying predefined parameter values to the operating parameters according to the second mode.

Changing the mission according to the step 310 can include a first phase of operational change. In a second phase according to a step 312 of the method 300, the M-RBS 200 further adjusts and/or fine-tunes its operating parameters. The M-RBS 200 refines the parameter values, e.g., periodically, while the M-RBS 200 is in the second mode. The refinement is based on indications according to the step 312. The indications result from an analysis performed at the M-RBS 200 and/or received via the interface 214 or 216.

Changing the mode according to the step 310 and/or further changing one or more of the operating parameters according to the step 312 allows optimizing the performance of the M-RBS 200 within the telecommunications network 100.

Figure 5:
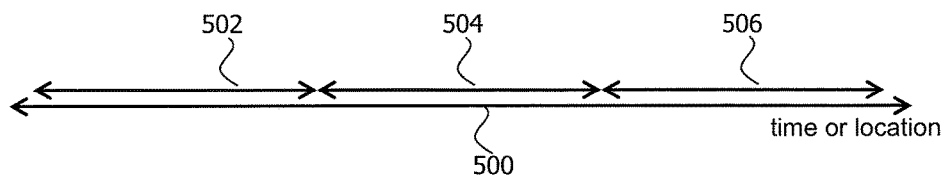
FIG. 5 schematically illustrates virtual cells implementable by one or more of the movable radio base stations of FIG. 1 or 2.

FIG. 5 schematically illustrates an area 500 to be covered by the telecommunications network 100. The area 500 is subdivided into a plurality of virtual cells 502, 504 and 506. As the M-RBS 200 passes the virtual cell 502, e.g., as long as the subarea of the virtual cell 502 is within the radio range for coverage by the M-RBS 200, the M-RBS 200 is in a first mode for providing the wireless access 202 to UEs 120 in or connected to the virtual cell 502 according to the step 306. Crossing over from the virtual cell 502 to the neighboring virtual cell 504 triggers the M-RBS 200 to change from the first mode to the second mode according to the step 308. As the M-RBS 200 enters the virtual cell 504, the mode is changed according to the step 310. For example, changing the mode may include changing a cell identity used to unambiguously identify a cell within the telecommunications network 100 as a Public Land Mobile Network (PLMN). The cell identity may be defined according to standard document Third Generation Partnership Project (3GPP) Technical Specification (TS) 36.331 (e.g., Version 12.1.0), Section 6.3.4, in an LTE implementation.

Alternatively or in addition, the different modes relate to different time intervals. A time axis indicated at reference sign 500 is subdivided into time intervals 502, 504 and 506. In the method 300, the mode of operating the M-RBS 200 is changed according to the predefined time intervals 502 to 506.

The M-RBS 200 adapts its operation based on the operating parameters. Exemplary operating parameters are described in the following. Embodiments of the technique can implement any subset of below operating parameters and, optionally, further operating parameters.

The operating parameters can specify a least one of the standard implemented by the telecommunications network 100 (e.g., GSM, UMTS and LTE), radio transmission used for the wireless access 202 (e.g., carrier frequency, antenna characteristic and antenna diversity) and kinematics of the M-RBS 200.

More specifically, for a flying M-RBS 200, a first operating parameter includes the altitude of the M-RBS 200. The altitude may be specified as height above ground level. The altitude influences the coverage area of the cell implemented by the M-RBS 200. Thus, the altitude influences the reachability of certain UEs to which the M-RBS 200 provides service (as a serving cell). The lower the altitude, the higher is the data throughput provided by the M-RBS 200 to the UEs 120. Furthermore, the lower the altitude, the smaller is the coverage area provided by the M-RBS 200.

A second operating parameter includes the velocity of the M-RBS 200. The velocity includes direction and speed of movement. The M-RBS 200 can adjust its velocity. Optionally, the motion of the M-RBS 200 corresponds to a stationary mode (e.g., including a non-zero velocity and a zero time-averaged velocity, and/or a circular path). The stationary mode of the M-RBS 200 corresponds to an average velocity that is substantially equal to zero.

The velocity of the M-RBS 200 may be specified relative to ground. The velocity influences an achievable data throughput and/or the Quality of Service (QoS) for at least certain UEs. Furthermore, a mobility performance of the UEs 120 depends on the relative velocity between the M-RBS 200 and the UEs 120. The less the difference in velocity between the M-RBS 200 and the UEs 120, the higher is the data throughput provided by the M-RBS 200 to the UEs 120.

A third operating parameter includes a number of UEs 120 allowed to connect to the M-RBS 200. The number is also referred to as a maximum allowed number of connected UEs 120. Optionally, different types of UEs (e.g., depending on terminal type and/or subscription, such as premium users) are distinguished. The wireless access 202 may be restricted depending on the type.

A fourth operating parameter includes at least one of carrier frequency and bandwidth. Different frequency bands or channels provide different propagation environments depending on, e.g., a current location of the M-RBS 200 and/or the current velocity of the M-RBS 200.

A fifth operating parameter includes transmission power. The transmission power (e.g., used by the M-RBS 200 for providing the access 202) is adjusted to provide, e.g., more coverage and/or more network capacity. The larger the transmission power of the M-RBS 200, the higher is the data throughput and/or the larger is an area covered by the M-RBS 200.

A sixth operating parameter includes handover parameters (also referred to as mobility parameters). The handover parameters balance how fast and/or frequently a UE 120 of the telecommunications network 100 is able to change from a serving cell to another cell. The handover parameters may include a threshold for the handover, e.g., in terms of a difference in received signal power between the M-RBS 200 and another M-RBS or S-RBS.

Each mode relates to a certain set of default parameter values for the operating parameters. In one embodiment, the mode to be assumed next is signaled to the M-RBS 200 before or upon receiving the trigger for changing the mode according to the step 310. The changing unit 204 retrieves the set of default parameter values from a database using the signaled mode. E.g. the database may be an internal database of the M-RBS 200 (e.g. the aforementioned memory) or may be an external database from which the M-RBS 200 may receive the set of default parameters. In another embodiment, the M-RBS 200 receives the set of default parameter values before or upon receiving the trigger for changing the mode according to the step 310 e.g. in a way as mentioned before.

Exemplary modes are described in the following. The M-RBS 200 can assume any subset of the modes described below and, optionally, further modes.

A first mode includes a coverage mode. In the coverage mode, the M-RBS 200 flies at an altitude that is relatively high compared to the other modes or the highest altitude compared to the other modes. The M-RBS 200 provides service over a large coverage area, e.g., to a large number of UEs 120. In the coverage mode, the M-RBS 200 further moves to find an optimal position relative to surrounding (or neighboring) M-RBSs 200, e.g., so as to provide coverage to UEs 120 not covered by the surrounding (or neighboring) M-RBSs 200.

The M-RBS 200 detects, if UEs 120 are already registered in the telecommunications network 100. The M-RBS 200 sends (e.g., periodically) location update requests and/or attach signals to the UEs 120 to force a location update or attaching of the UEs 120 that lost coverage in the meantime.

In a first algorithm implementing the determination of the optimal location, the optimal location of the M-RBS 200 is determined using a Mobile Positioning Service node in the telecommunications network 100, which registers the locations of the UEs 120. The Mobile Positioning Service node indicates the location to the M-RBS 200. Alternatively or in addition, in a second algorithm, the M-RBS autonomously determines the location. E.g., the M-RBS 200 tries out locations, e.g., in a specified area. In a third algorithm, the M-RBS 200 stores information of locations at which a maximum number of UEs has been determined or are expected to be identified.

Based on the determined information and according to the mode (e.g., the coverage mode), the M-RBS 200 tries to cover as many UEs 120 as possible by adjusting, e.g., one or more of latitude, longitude and altitude according to one or more of the three afore-mentioned algorithms (in the previous paragraph).

Optionally, the M-RBS 200 applies conservative mobility parameters (e.g., a low threshold for handovers) that potentially triggers more handovers and/or provides more robust handovers to and/or from the cells defined by other S-RBSs 110 or other M-RBSs 200.

In at least some embodiments, the transmission power applied by the M-RBS 200 in the coverage mode is higher or the highest compared to the other modes. The carrier frequency is typically lower and/or the channel bandwidth is less compared to the other modes.

A second mode includes a throughput mode. In the throughput mode, the M-RBS 200 optimizes or increases data throughput, e.g., to a limited number of UEs 120. The limited number of UEs 120 are served by one or more dedicated M-RBSs 200, e.g., depending on demand. The limited number of UEs 120 may be determined based on their International Mobile Subscriber Identity (IMSI) (e.g., according to their subscription for premium users) and/or based on a certain area. The M-RBS 200 stays at an altitude relatively lower, or the lowest, compared to the other modes. The altitude allows a closer approach to the UEs 120 and decreases the coverage area of the M-RBS 200. The channel bandwidth is optionally larger in the throughput mode compared to at least some of the other modes for higher user data throughput.

A third mode includes a fast user support. To support fast mobile users, e.g., UEs 120 moving with a velocity relative to ground above a predefined threshold, the M-RBS 200 applies handover parameters specific for the fast user support mode. The handover parameters trigger UE handovers faster, e.g., so as to reduce a rate of failed UE handovers for fast users.

The velocity of individual UEs 120 or a group of the UEs 120 may be estimated by various means, e.g., Doppler measurements, location updates and/or user-based. The user-based estimation is based on an indication received from the UE 120 at the M-RBS 200. The indication reports the UE velocity and/or whether or not a predefined velocity threshold is exceeded.

In an advanced embodiment of the third mode, the M-RBS 200 enters a user tracking mode. E.g., the M-RBS 200 follows certain UEs 120 by decreasing the relative velocity between the M-RBS 200 and the corresponding one or more UEs 120. Mobility issues, e.g., handover failures and related service outage, can be reduced or essentially avoided in the user tracking mode. Furthermore, signal degradation due to high Doppler spread (e.g., corresponding to largely varying relative velocities between transmitter and receiver) can be avoided in at least some implementations.

For implementing the user tracking mode, the M-RBS 200 estimates at least one of the location of the UE 120, UE location changes of the UE 120 and the velocity of the UE 120. The M-RBS 200 derives an estimated trajectory based on the location and/or velocity estimates. The M-RBS 200 changes its mobility so as to move along and/or in the direction of the trajectory. By way of example, a position of the M-RBS 200 (e.g., to which the M-RBS 200 moves after 1 or Δt seconds) is determined according to:

$$L_{next}^{M\text{-}RBS} = L_{now}^{M\text{-}RBS} + v_{tracked\ UE} \cdot \Delta t.$$

Herein, $L_{next}^{M\text{-}RBS}$, $L_{now}^{M\text{-}RBS}$ and $v_{tracked\ UE}$ are vectors, e.g., two-dimensional vectors parallel to ground. The M-RBS 200 sets its next position to $L_{next}^{M\text{-}RBS}$. The time step Δt should be short enough, so that the M-RBS 200 can assume that the one or more tracked UEs 120 are moving at substantially constant velocity $v_{tracked\_UE}$.

Alternatively or in addition, the M-RBS 200 measures signals received from the UE 120 to ensure that the M-RBS 200 maintains a predefined distance to the tracked UEs 120. For example, the M-RBS 200 moves in a direction so that the signal strength (e.g., due to path loss between the M-RBS 200 and the UE 120) is kept within predefined limits. More specifically, the M-RBS 200 moves in different (e.g., perpendicular) directions. The one direction that keeps signal strength best within the predefined limits is chosen as the direction to move further the M-RBS 200. Alternatively or in addition, the trajectory of the UE 120 is estimated based on the afore-mentioned signal strength algorithm.

A fourth mode includes link optimization. The link optimization fulfills a predefined minimum uplink data rate and/or a predefined minimum downlink data rate. For example, the operating parameters include a Time-Division Duplex (TDD) configuration. Different M-RBSs 200 may have different TDD configurations. To increase the uplink data rate, the M-RBS 200 optionally reduces its altitude to decrease the distance between the M-RBS 200 and a targeted UE 120 on the ground, e.g., so as to compensate for a limited transmission power of the targeted UE 120. Alternatively or in addition, the distance between the M-RBS 200 and the targeted UE 120 is decreased and/or transmission power of the M-RBS 200 is increased to optimize the downlink data rate.

A fifth mode includes a rescue mode, e.g., to provide communication and data services to a rescue team on ground. The M-RBS 200 assumes predefined parameter values, e.g., for height, velocity and transmission power.

Triggers for the step 310 are described in the following. The mission can be changed based on a command received at the M-RBS 200 from a network operation centre (NOC).

Alternatively or in addition, the mission can be changed according to the step 310 upon request from other radio base stations 110 and 200, e.g., surrounding M-RBSs 200. For example, a M-RBS 200 may measure signal interference. Depending on a result of the measurement, the measuring M-RBS 200 informs one or more surrounding M-RBSs 200 to reduce signal interference. The signal interference may originate in certain network configurations from an M-RBS 200 located at an altitude higher than its surrounding M-RBSs 200. In this network configuration, the measuring M-RBS 200 may inform the interfering M-RBS 200 to reduce its altitude.

The signal interference measurement may trigger changing at least one of transmission power and altitude of the M-RBS 200 from which the interference originates.

Alternatively or in addition, the mission of the M-RBS 200 is changed responsive to statistical observations of the UEs 120. For example, the step 310 is triggered by a change in user behavior, spatial distribution of the UEs 120 and/or user demand. More specifically, the step 310 may be triggered by an increased number of connected UEs 120, an increased data throughput per cell, an increased velocity of the connected UEs 120 or of a subgroup thereof, and/or an increased demand for a certain service type.

The M-RBS 200 detects a changed number of connected UEs 120 by means of sensors. The sensors are mounted on the M-RBS 200. The sensors include, e.g., an infrared camera, a camera in the visual spectrum and/or a microphone. When the number of connected UEs 120 is above or below a certain threshold, the step 310 is triggered.

Alternatively or in addition, the changing unit 204 is adapted to control the M-RBS 200 for supporting a rescue mission to be performed, e.g. after an accident or an earthquake. E.g., the NOC triggers the changing unit 204 for changing the M-RBS 200 to the rescue mode. The rescue mode may be defined as the exemplary fifth mode of operation, e.g., defined by specific operating parameters. In the rescue mode, the changing unit 204 estimates a number of potential victims, e.g., based on the connected UEs 120. The changing unit 204 reports location information of the potential victims to the NOC or to a server for supporting the rescue mission.

In a variant, the changing unit 204 estimates the number of potential victims based on the sensors mounted at the M-RBS 200. Based on a first number of connected UEs 120 and a second number of persons detected by the sensors, the changing unit 204 may report more detailed information for supporting the rescue mission to be performed. E.g., the second number may relate to survivors or victims in need of first aid. By way of example, when the first number corresponds to 70 active UEs serviced by the M-RBS 200 and the infrared sensor detects only the second number of 35 persons, the other 35 person might not be alive while their UEs 120 are still active. In this case, the information provided by the changing unit 204 may allow focusing or prioritizing the rescue mission to save the persons alive. In addition, the NOC can call those UEs 120, in association with which no person has been detected by the sensors, to detect further persons alive. The information of the changing unit 204 is reported to the NOC. The NOC combines the received information, e.g., with a number of active UEs 120 in the area.

Still further, the step 310 may be triggered by a status of the M-RBS 200. For example, the status of the M-RBS 200 includes a battery status, a hardware temperature, a gasoline status and/or a maintenance status.

One of the M-RBSs 200 functions as a backhaul handler. The backhaul handler provides to a plurality of M-RBS 200 connectivity to the backhaul network of the telecommunications network 100. If the battery level falls below a first threshold, the corresponding M-RBS 200 does not serve as a backhaul handler. The role of the backhaul handler is optionally transferred or swapped to another M-RBS 200 having a sufficient or higher battery level.

If, e.g., at a later point in time, a second threshold for the battery level lower than the first threshold for the battery level is reached, the M-RBS 200 moves back to a base for recharging, thereby stopping a current mode of the M-RBS 200 and not adopting a further mode. For explanation purposes, when the M-RBS 200 is changing its mode, the current mode may be stopped because the parameters are being changed. After the M-RBS 200 has completed parameter changes, the M-RBS 200 starts the second mode.

Moreover, when the battery status is below a predefined threshold, the M-RBS 200 flies at a lower altitude and/or decreases its transmission power. Optionally, an antenna opening angle or an antenna tilt angle is changed (e.g., by moving the antenna reflector) so as to cover the same area covered before decreasing altitude. This predefined threshold may be below, equal or above the first and/or second battery level threshold explained above. Hence, the current mode of the M-RBS 200 may be maintained while the associated operating parameters may be changed, as will be further explained in the following.

While the M-RBS 200 is in a certain mode, one or more of the operating parameters is further changed (which is also referred to as fine-tuning of M-RBS parameters).

Changing individual parameter values while the M-RBS 200 is in a certain mode can be performed gradually and/or smoothly, e.g., as the battery is discharged, as is explained above, and/or the hardware temperature increases. One or more of the triggers described above for changing the mode can also trigger a change of individual parameters, optionally the parameter values thereof, while the M-RBS 200 stays in the mode. Further indications for changing individual operating parameters are described below.

A neighboring M-RBS 200 indicates interference to the M-RBS 200, e.g., based on reports from UEs 120 at a cell edge of a neighboring cell defined by the neighboring M-RBS 200. In an exemplary implementation, the indication received at the M-BRS 200 from the neighboring M-BRS 200 includes operating parameters and, optionally, parameter values to be used. E.g., the indication specifies the transmission power, the altitude, the velocity, etc. The M-RBS 200 selectively accepts or ignores the indicated operating parameters and/or parameter values thereof. If the M-RBS 200 accepts the indicated operating parameters and/or parameter values thereof, the corresponding operating parameter is changed, e.g., according to the indicated parameter value.

Alternatively or in addition, the indication includes a report of previous handovers and/or handover failures. Upon receiving a report of handover failures, the M-RBS 200 changes its operating parameters. The change may include lowering or increasing the altitude, lowering or increasing the transmission power and/or changing the antenna tilt.

According to an exemplary implementation, the step 312 is looped. The one or more operating parameters are gradually changed until receiving of the reports (e.g., handover failure reports) ceases.

Alternatively or in addition, radio measurements performed by the M-RBS 200 are triggered by dropped packet-switched sessions and/or dropped calls. High signaling load, e.g., due to negative measurement results, triggers countermeasures. Herein, negative measurement results may be determined, if a number of dropped sessions and/or calls is above a certain threshold. The countermeasures include increasing the interval for a periodic location update or for attaching of the UEs 120. The M-RBS 200 continues fine-tuning of the operating parameters with a modified measurement period. E.g., location and number of attached UEs 120 are the two operating parameters that are being fine-tuned in this stage.

Exemplary transitions from the first mode to the second mode are described in the following.

A first transition changes from the capacity mode to the coverage mode. A trigger for the first transition depends on the number of connected UEs 120 in an area covered by the M-RBS 200. When the number increases, the M-RBS 200 changes from the capacity mode as the first mode by increasing the altitude for the coverage mode as the second mode. If the number decreases in the coverage mode as the first mode, the M-RBS 200 decreases the altitude for entering the capacity mode as the second mode.

Alternatively or in addition, changing between capacity mode and coverage mode includes changing the transmission power.

Alternatively or in addition to the number of connected UEs 120 as a trigger for the first transition between capacity mode and coverage mode, a data throughput per cell observed by the M-RBS 200 for the cell implemented by the M-RBS 200 may trigger the step 310. For example, when cell throughput exceeds a predefined threshold, the M-RBS 200 switches from coverage mode to capacity mode.

When changing to capacity mode, the M-RBS 200 optionally lowers the altitude. Alternatively or in addition, multiple Radio Access Technologies (RATs) are provided from one M-RBS 200 towards a restricted area (e.g., for which the capacity mode is realized by the M-RBS 200). Furthermore, the area covered in the coverage mode can be further increased by using multiple RATs. For example, while in coverage mode, different RATs are served in different sectors of the area covered by the M-RBS 200, in order to provide a larger coverage area. The M-RBS 200 can thus provide different modes to different areas or sectors of a cell. Activating multiple RATs results in a reduced operation time powered by battery, so that the M-RBS 200 returns more frequently to a recharging base.

A second transition includes changing from the capacity mode to the fast-user support mode. Fast UEs 120 can be identified based on their estimated velocity, by explicit indication received from the UEs 120 or by identifying the UEs 120 to belong to a certain user group (e.g., subscribers defined as premium users). In response to detecting fast UEs 120, the M-RBS 200 refrains from a stationary first mode that provides capacity for a large number of UEs 120 and changes to a second mode with non-zero average velocity by following the identified (e.g., tracked) UEs. The M-RBS 200 optionally adjusts its handover parameters to enable a better mobility performance allowing for more frequent handovers for the identified UEs 120.

For example, the capacity mode provides service according to LTE (also refer to as 4G) only. By switching to the fast-user support mode, 3G access 202 is provided in addition by the same M-RBS 200, so that 4G access 202 is exclusively provided to the identified UEs 120 (e.g., the tracked or premium users), while the 3G access 202 is provided to other UEs 120.

A third transition includes changing between the capacity mode and the link optimization mode. A need for optimizing uplink and/or downlink data rate is determined based on a changed data throughput per cell in the downlink direction and the uplink direction, respectively. In order to optimize the uplink data rate, the M-RBS 200 moves closer to the UEs 120 that demand the higher uplink data rate. By approaching the corresponding UEs 120, the path loss between the M-RBS 200 and the respective UE 120 is minimized. At the same time, in order not to degrade downlink performance for the other UEs 120 connected to the M-RBS 200 and not demanding a higher uplink data rate, the transmission power is increased, at least towards these UEs 120.

In the capacity mode, the M-RBS 200 ensures enough capacity for a large number of connected UEs 120. Limiting individual data rates (also refer to as throttling) is one way of fairly sharing the capacity for a large number of UEs 120. When the M-RBS 200 switches to the link optimization mode, the throttling (e.g., the upper limit for the UE-individual data rate) is removed and/or an additional RAT (e.g., 3G access 202 in addition to 4G access 202) is provided.

A fourth transition includes changing between the coverage mode and the fast-user support mode. Similar to the second transition, the M-RBS 200 lowers its altitude and follows the fast UEs 120 based on one or more of the triggers described for the second transition. When a certain fraction of the UEs 120 tracked in the fast-user support mode refrain from following the other tracked UEs 120, the M-RBS 200 returns to the coverage mode, e.g., by increasing its altitude so as to be reachable by all potentially connected UEs 120 in the area.

In one implementation, concentrating on a subset of UEs 120 (e.g., premium users) instead of a large number of UEs 120 reduces the coverage area, e.g., resulting from a lower altitude. Altitude and/or covered area are selected depending on the size of area, within which the subset of UEs 120 is located. Furthermore, a reaction to handover is faster than in the coverage mode.

Multiple RATs are used differently in the coverage mode and the fast-users support mode. For example, 3G and 4G access 202 is provided to a wide area in the coverage mode. By switching to the fast-user support mode, the 4G access 202 is exclusively provided to a subgroup of UEs 120 (e.g., premium users), while 3G access 202 is provided to the other UEs 120. A restriction to 3G access 202 for some UEs 120 can imply a reduction of the covered area.

A fifth transition includes changing between the coverage mode and the link optimization mode. The triggers described for the third transition apply. In the case of a multiple-RAT access 202, throttling applied in the coverage mode is removed in the link optimization mode while, optionally, the coverage area is reduced.

A sixth transition includes changing between the fast-user support mode and the link optimization mode. In the case of the multiple-RAT access 202, one RAT (e.g., 4G) is exclusively provided to a subgroup of UEs 120 in the fast-user support mode. In the link optimization mode, the previously exclusive RAT is allocated to all connected UEs 120 so as to optimize link data rates, e.g., taking terminal types into account. For example, multiple RATs are equally split to provide optimized link data rates to a large number of UEs.

For all transitions mentioned above, multiple Transmission Control Protocol (TCP) and/or User Datagram Protocol (UDP) paths are optionally applied. Furthermore, video streaming can be provided via one RAT only, e.g., 3G. For the link optimization mode, multiple RATs are provided to the same UE 120. For example, the video streaming is provided to the same UE 120 via both 3G and 4G.

Figure 6:
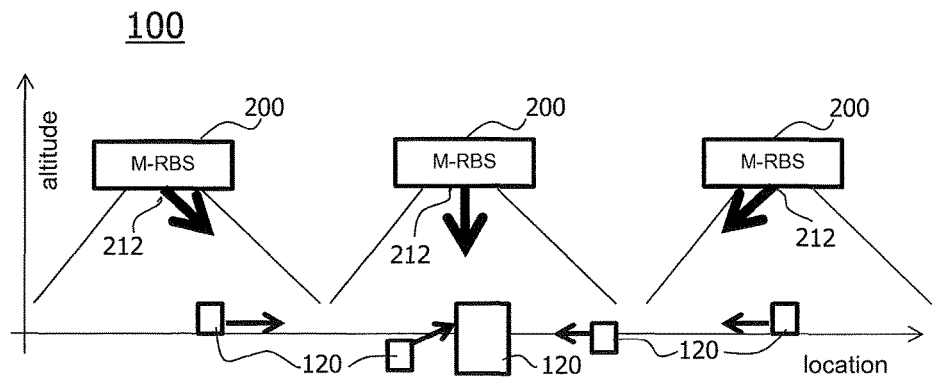
FIG. 6 schematically illustrates a first implementation of changing a mode of the movable radio base station according to the method of FIG. 3 or 4.

Changes of the operating parameters associated with exemplary changes of the mode of the M-RBS 200 are described with reference to FIGS. 6 to 8. FIG. 6 schematically illustrates a telecommunications network 100 including three M-RBSs 200. The M-RBSs 200 provide access 202 to a plurality of UEs 120. Initially, the M-RBSs 200 are substantially equally spaced apart from each other and, optionally, at equal altitude (which is indicated at the vertical axis of FIG. 6).

In the capacity mode as the first mode, the M-RBSs 200 fly as low as possible to provide high data throughput to the UEs 120 in the corresponding cell formed by each of the M-RBSs 200.

As more and more UEs 120 move to the coverage area of the M-RBS 200 in the center of FIG. 6, the M-RBS 200 at the location of increasing UE density requires neighboring or other M-RBSs 200 to additionally provide access 202 in the area of increasing UE density. For example, the density of M-RBSs 200 is adjusted so as to correspond to a density of connected UEs 120 averaged over one cell area.

Alternatively or in addition, the tilt angle of the antennas 212 mounted at the neighboring or other M-RBSs 200 is changed. The antennas 212 are rotatably mounted. Each antenna 212 can point in a different direction, e.g., towards ground (by setting the tilt angle to 90°) or to direct the antenna 212 towards, e.g., a hill or the center cell in FIG. 6 (e.g., with a tilt angle of 45° or 60°).

By way of example, a mass event lasts for six hours in a rural area. Before and after the mass event, the M-RBSs 200 provide access 202 that covers roads towards the location of the mass event. During the event, the access 202 is focused on the location of the mass event, while one M-RBS 200 additionally covers a wide area so as to provide access to a minor amount of UEs 120 (e.g., located in vehicles on the surrounding roads).

As the event begins, the M-RBS 200 located at the event requests the neighboring M-RBSs 200 to help serving the hot spot formed at the event. The request is triggered when the capacity in the area serviced by one M-RBS 200 grows above a threshold. The corresponding M-RBS 200 triggers the other M-RBSs 200 to fly to the hot spot. If necessary, the transmission power and/or the altitude are also changed.

Figure 7:
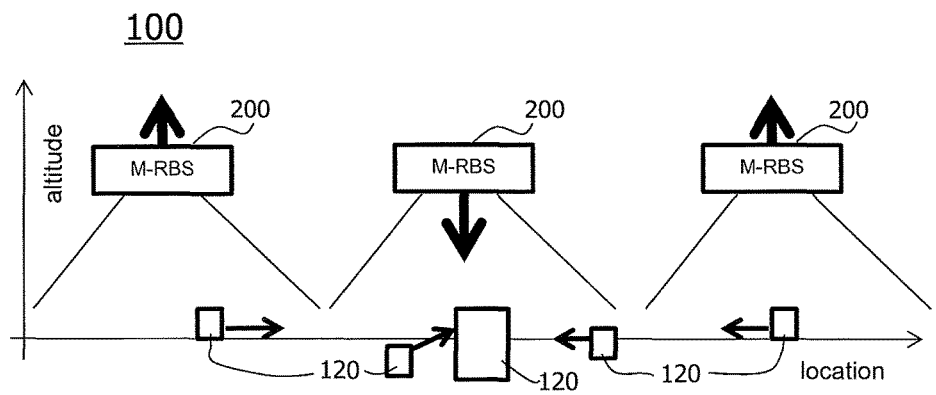
FIG. 7 schematically illustrates a second implementation of changing a mode of the movable radio base station according to the method of FIG. 3 or 4.

FIG. 7 schematically illustrates a transition between capacity mode and coverage mode. Initially, the M-RBSs 200 fly at substantially equal altitude. Each of the M-RBSs 200 flies as low as possible to provide high data throughput in the capacity mode, while observing coverage criteria for UEs 120 at the cell edge.

In response to an inhomogeneity of the UEs 120, the M-RBS 200 located at the increasing UE density flies lower providing access to the UEs 120 at the hot spot. E.g., the M-RBS 200 at the hot spot enters the capacity mode as the second mode.

Optionally, neighboring M-RBSs 200 increase the altitude (which may further be accompanied by increasing the transmission power) so as to enter the coverage mode as the second mode. Alternatively or in addition, the neighboring M-RBSs 200 increase an antenna opening angle.

In any one of the scenarios and transitions described in, multiple M-RBSs 200 may serve an area out of which one of the M-RBSs 200 has to return to a recharging base for recharging its batteries and/or for maintenance. Whenever such a mission or mode stops, the corresponding M-RBS 200 is replaced by one of the other M-RBSs 200.

When upon the time of arrival of the replacing M-RBS 200 and at the time at which the replaced M-RBS 200 stops providing the access 202, a coverage handling or a capacity handling previously performed by the replaced M-RBS 200 is re-distributed among the remaining M-RBSs 200 until the replacing M-RBS 200 has arrived. During the time window after the active M-RBS 200 stops providing the access 202 and before the replacing M-RBS 200 resumes the access 202, the mode of one or more neighboring M-RBSs 200 is optionally changed.

Figure 8:
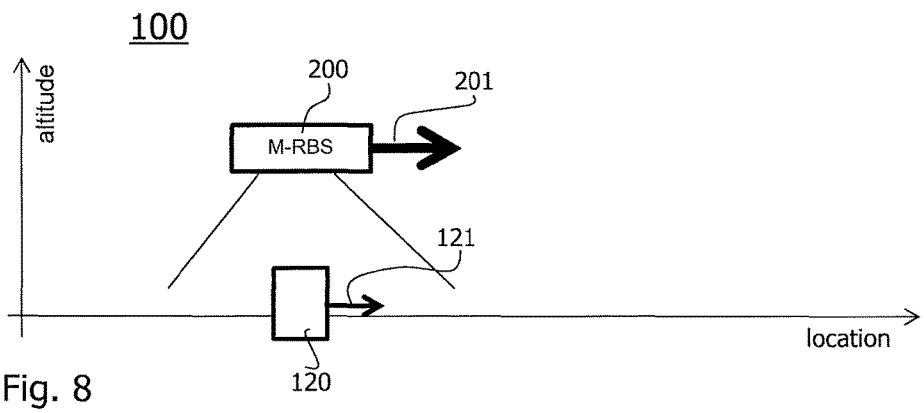
FIG. 8 schematically illustrates a third implementation of changing a mode of the movable radio base station according to the method of FIG. 3 or 4.

FIG. 8 schematically illustrates tracking a UE 120 by an M-RBS 200. The M-RBS 200 follows the UE 120 (or a group of UEs 120 when the UEs 120 are moving together, e.g., in traffic on a road, when people are leaving a stadium or marching, etc.) so as to minimize or eliminate on average a difference in the velocity 201 of the M-RBS 200 and the velocity 121 of the UE 120. Unless the M-RBS 200 is notified by another M-RBS 200 (e.g., to increase its altitude or change another operating parameter) the M-RBS 200 tracks the UE 120. Following the UE 120 is achieved by detecting and locating the UE 120 in the telecommunications network 100 or any other of the locating means described above.

During the occurrence of a traffic jam (e.g., on a motorway) or in rural areas, the stationary network infrastructure realized by the S-RBS 110 may become insufficient or the deployment of stationary network infrastructure may be impossible. In such cases, one or more M-RBSs 200 are sent to satisfy the sudden increase in the capacity. Some of the M-RBSs 200 are sent to ensure a backhaul link, e.g., a connection to a stationary RBS 110.

As has become apparent from above description of exemplary embodiments, operating parameters, e.g., radio parameters, of a telecommunications network can be set and/or optimized for movable radio base stations. The telecommunications network can react to planned and unpredictable scenarios by changing the modes of operating the movable radio basis stations so as to optimize cellular network performance.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of operating a movable radio base station, the movable radio base station configured to provide to a plurality of user equipments wireless access to a telecommunications network in a first mode and in a second mode different from the first mode, wherein each of the first mode and the second mode specifies a set of parameter values for operating parameters of the movable radio base station, the method comprising:
    exchanging the parameter values with another movable radio base station, wherein the operating parameters of the movable radio base station include an altitude of the movable radio base station; and
    changing the movable radio base station from the first mode to the second mode, wherein changing the movable radio base station from the first mode to the second mode comprises decreasing the altitude of the movable radio base station and triggering one or more neighboring movable radio base stations to increase their altitude.

2. The method of claim 1, wherein the second mode specifies the operating parameters upon entering the second mode by setting the operating parameters to parameter values predefined for the second mode.

3. The method of claim 1, further comprising at least one of:
    performing, at the movable radio base station, a measurement resulting in a measurement result; and
    receiving, at the movable radio base station, a measurement result of a measurement.

4. The method of claim 3, wherein the measurement is related to the wireless access.

5. The method of claim 3, wherein the measurement result is indicative of at least one of:
    radio interference between the movable radio base station and one or more neighboring movable radio base stations; and
    handovers of the user equipments that involve the movable radio base station as handover source cell.

6. The method of claim 1, wherein at least one of the parameter values is changed while the movable radio base station is in the second mode.

7. The method of 1: further comprising at least one of:
    performing, at the movable radio base station, a measurement resulting in a measurement result; or
    receiving, at the movable radio base station, a measurement result of a measurement;
    wherein at least one of the parameter values is changed while the movable radio base station is in the second mode
    wherein the at least one of the parameter values is changed in response to the measurement result.

8. The method of claim 1, further comprising receiving from and/or signaling to one or more neighboring movable radio base stations at least one of a current mode, current parameter values, and the measurement result.

9. The method of claim 1, wherein the changing the mode is triggered by at least one of a command signal received from a network operation center of the telecommunications network and the measurement result.

10. The method of claim 1, wherein the changing the mode is triggered by at least one of velocity of the user equipments connected to the movable radio base station and an inhomogeneity of the user equipments connected to the movable radio base station.

11. The method of claim 1, wherein the movable radio base station is mounted on an unmanned aerial vehicle.

12. The method of claim 1, wherein the operating parameters of the movable radio base station include at least one of:
    velocity of the movable radio base station;
    maximum number of the user equipments connected to the movable radio base station;
    carrier frequency of the movable radio base station;
    frequency bandwidth of the movable radio base station;
    transmission power of the movable radio base station;
    one or more tilt angles of one or more antennas configured to provide the wireless access and mounted at the movable radio base station; and
    a threshold for allowing handovers of the user equipments connected to the movable radio base station.

13. A non-transitory computer readable recording medium storing a computer program product for operating a movable radio base station, the movable radio base station configured to provide to a plurality of user equipments wireless access to a telecommunications network in a first mode and in a second mode different from the first mode, wherein each of the first mode and the second mode specifies a set of parameter values for operating parameters of the movable radio base station, the computer program product comprising software instructions which, when run on processing circuitry of a computing device, causes the computing device to:
    exchange the parameter values with another movable radio base station, wherein the operating parameters of the movable radio base station include an altitude of the movable radio base station; and
    change the movable radio base station from the first mode to the second mode by decreasing the altitude of the movable radio base station and triggering one or more neighboring movable radio base stations to increase their altitude.

14. A device for operating a movable radio base station, the movable radio base station configured to provide to a plurality of user equipments wireless access to a telecommunications network in a first mode and in a second mode different from the first mode, wherein each of the first mode and the second mode specifies a set of parameter values for operating parameters of the movable radio base station, the device comprising:
    processing circuitry;
    memory containing instructions executable by the processing circuitry whereby the device is operative to:
    exchange with another movable radio base station the parameter values, wherein the operating parameters of the movable radio base station include an altitude of the movable radio base station; and
    change the movable radio base station from the first mode to the second mode by decreasing the altitude of the movable radio base station and triggering one or more neighboring movable radio base stations to increase their altitude.

15. A movable radio base station configured to provide to a plurality of user equipments wireless access to a telecommunications network in a first mode and in a second mode different from the first mode, wherein each of the first mode and the second mode specifies a set of parameter values for operating parameters of the movable radio base station, the movable radio base station comprising:

processing circuitry;

memory containing instructions executable by the processing circuitry whereby the movable radio base station is operative to: exchange with another movable radio base station the parameter values, wherein the operating parameters of the movable radio base station include an altitude of the movable radio base station; and change the movable radio base station from the first mode to the second mode by decreasing the altitude of the movable radio base station and triggering one or more neighboring movable radio base stations to increase their altitude.

* * * * *